(12) United States Patent
Arnault et al.

(10) Patent No.: US 8,485,734 B2
(45) Date of Patent: Jul. 16, 2013

(54) BALL BEARING, AND A MOTOR VEHICLE FITTED WITH SUCH A BEARING

(75) Inventors: Benoit Arnault, Saint Cyr sur Loire (FR); Yves-André Liverato, St Paterne Racan (FR); Jacques Charpentier, Tours (FR); Sylvain Bussit, Monnaie (FR)

(73) Assignee: Aktiebolaget SKF, Gothenburg (SE)

( * ) Notice: Subject to any disclaimer, the term of this patent is extended or adjusted under 35 U.S.C. 154(b) by 91 days.

(21) Appl. No.: 13/119,387

(22) PCT Filed: Sep. 15, 2009

(86) PCT No.: PCT/EP2009/061925
§ 371 (c)(1),
(2), (4) Date: May 26, 2011

(87) PCT Pub. No.: WO2010/031756
PCT Pub. Date: Mar. 25, 2010

(65) Prior Publication Data
US 2011/0222806 A1   Sep. 15, 2011

(30) Foreign Application Priority Data
Sep. 16, 2008   (FR) ...................... 08 56213

(51) Int. Cl.
*F16D 23/14*   (2006.01)
*F16C 33/78*   (2006.01)
(52) U.S. Cl.
USPC ..................... 384/607; 384/612; 192/110 B (58) Field of Classification Search
USPC ............ 384/495, 496, 497, 607, 612; 192/98, 192/110 B
See application file for complete search history.

(56) References Cited

U.S. PATENT DOCUMENTS 1,321,417 A * 11/1919 Carlborg et al. .............. 384/497
1,457,584 A    6/1923  McCuen
(Continued)

FOREIGN PATENT DOCUMENTS

DE   7017008 U   7/1973
DE   19912432 A1  9/1999
(Continued)

*Primary Examiner* — Thomas R Hannon
(74) *Attorney, Agent, or Firm* — Mark A. Ussai; Bryan Peckjian (57) ABSTRACT

This ball bearing (1) forms an axial force transmission member and comprises an inner ring (3) and an outer ring (4), and a single series of balls (6) placed in a rolling chamber between the inner ring (3) and the outer ring (4). A first ring (4), amongst the inner ring (3) and the outer ring (4), forms a travel track (411) in a section of a sphere centered on a geometric point (C4) belonging to an axis of symmetry ($X_4$) of this first ring (4). The first ring (4) supports a seal (11) insulating the rolling chamber relative to the outside. The second ring (3), amongst the inner ring (3) and the outer ring (4), is provided with a sealing zone (314) designed to interact with the seal and in the shape of a section of a sphere centered on a second geometric point ($C_3$) belonging to an axis of symmetry ($X_3$) of the second ring. The radii ($R_3$, $R_4$) of the sections of a sphere are different. In the installed configuration of the bearing, the first geometric point ($C_4$) and second geometric point ($C_3$) are superimposed and offset axially, along the axis of symmetry ($X_3$) of the second ring (3), relative to the series of balls.

11 Claims, 5 Drawing Sheets

U.S. PATENT DOCUMENTS

| | | | | |
|---|---|---|---|---|
| 1,888,361 A | * | 11/1932 | Robinson | 384/497 |
| 2,030,813 A | * | 2/1936 | Dolza | 192/110 B |
| 2,259,881 A | * | 10/1941 | Foley | 384/497 |
| 5,119,446 A | * | 6/1992 | Grafstrom et al. | 384/484 |
| 2004/0033000 A1 | | 2/2004 | Reuter | |

FOREIGN PATENT DOCUMENTS

| | | |
|---|---|---|
| FR | 2544429 A1 | 10/1984 |
| FR | 2698137 A1 | 5/1994 |
| WO | WO2007137939 A1 | 12/2007 |

\* cited by examiner

BALL BEARING, AND A MOTOR VEHICLE FITTED WITH SUCH A BEARING

TECHNICAL FIELD OF THE INVENTION

Ball bearings are sometimes used to transmit an axial force relative to a central axis of the bearing. This is particularly the case in clutch thrust bearings and bump stops used in motor vehicles.

BACKGROUND ART OF THE INVENTION

In the case of a clutch thrust bearing, it happens that the axis of the diaphragm clutch mechanism is not strictly in line with the axis of the output shaft of the gearbox, which may lead to high stresses on certain portions forming the clutch thrust bearing, to the point of limiting the service life of this type of equipment. Defects of alignment between the aforementioned axes may be such that these axes are not superimposed, while being parallel, or that these axes intersect. In this second case, the alignment defects have hitherto been relatively minor, which allows a conventional clutch thrust bearing to accommodate them.

If such an alignment defect becomes relatively major, particularly if the axes form between them an angle greater than 2°, the diaphragm of the clutch mechanism may press unevenly on the outer ring of the thrust bearing, which causes uneven wear. Because of the complexity of the mechanism, increasing notably since the emergence of dual clutches, and for economic reasons, the manufacturing tolerances of certain parts forming a clutch tend to increase, so that the angle of offset between the input and output axes of a clutch thrust bearing tends to increase to values greater than 2°.

To alleviate this drawback, it is known from WO-A-2007/137939 to produce a swivel joint between an inner ring, an adjustment ring and a sliding ring of a clutch thrust bearing. The use of adjustment and sliding rings, which are additional parts relative to a conventional thrust bearing, increases the cost price of this equipment and makes its installation more complex. Moreover, the axial space requirement of the thrust bearing is increased.

It is also known from US-A-2004/0033000 to produce, in the outer ring of a clutch thrust bearing, a track in the shape of a section of a sphere on which the balls can have a certain range of travel making it possible to adjust the position of the central axis of the inner ring relative to the position of the central axis of the outer ring. The volume lying between the inner and outer rings of such a thrust bearing must be insulated from the outside and a seal must be provided for this purpose, such a seal being more or less compressed depending upon the position of the balls on the travel track, which may cause premature wear of this seal.

Problems of the same kind arise with other ball bearings forming an axial-force transmission member such as, for example, bump stops of motor vehicles.

SUMMARY OF THE INVENTION

It is these drawbacks that the invention more particularly intends to remedy by proposing a new ball bearing making it possible to accommodate a defect of alignment of an input axis and an output axis of the bearing, while having an improved service life.

Accordingly, the invention relates to a ball bearing forming an axial-force transmission member, this bearing comprising an inner ring and an outer ring, and a single series of balls placed between these rings, a first ring, amongst the inner ring and the outer ring, forming a travel track in a section of a sphere centred on a first geometric point belonging to an axis of symmetry of this first ring which supports a seal insulating a ball-accommodating chamber relative to the outside. This bearing is characterized in that the second ring, amongst the inner ring and the outer ring, is provided with a sealing zone designed to interact with the seal, this sealing zone also being in the shape of a section of a sphere and centred on a second geometric point belonging to an axis of symmetry of the second ring, while the radii of the aforementioned sections of a sphere are different and while, in the installed configuration of the bearing, the aforementioned first and second geometric points are superimposed and offset axially along the axis of symmetry of the second ring, relative to the series of balls.

By virtue of the invention, the swivel-joint movement of the first ring relative to the second ring, which is possible because of the presence of the travel track of the balls, allows the seal supported by the first ring to be moved, in contact with or facing the sealing zone, with constant stresses on the seal. In other words, the invention allows the seal to work in a lasting manner even though the inner and outer rings can move one relative to the other in order to accommodate a defect of alignment between their respective central axes which correspond to the input and output axes of the bearing. Since the first and second geometric points are offset axially relative to the series of balls, the relative position of the travel track with respect to the sealing zone is compatible with the fact that the ball bearing can be subjected to an axial load. The balls do not risk being expelled from the rolling chamber by such a load.

According to advantageous but not obligatory aspects of the invention, such a bearing may incorporate one or more of the following features:
  According to a first embodiment, the seal comprises a lip resting slidingly on the sealing zone. As a variant, the seal may comprise an edge which extends at a predetermined, non-zero, distance from the sealing zone, this distance remaining fixed when the rings move one relative to the other.
  The sealing zone extends, between a zone for receiving the balls on the second ring and an edge of this ring, up to the level of this edge. As a variant, this sealing zone may extend up to a shoulder separating the sealing zone from the edge of the second ring.
  The angle of travel of the balls on the travel track is between 5° and 9°, preferably of the order of 7°.
  The apex angle of the sealing zone has a value greater than that of the apex angle of the travel track.
  The bearing comprises a sleeve mounted on the inner ring with the possibility of movement in a radial direction relative to a central axis of this ring, this sleeve being capable of transmitting an axial force to this ring.
  The ratio between, on the one hand, the axial distance between the superimposed geometric points and a plane passing through the centres of the balls and, on the other hand, the radius of the travel track, is between 0.25 and 0.75, preferably between 0.45 and 0.55.

The invention also relates to a use of a bearing as mentioned above in order to form a clutch thrust bearing of a motor vehicle. The invention may also be used to form a bump stop of a motor vehicle.

The invention finally relates to a motor vehicle fitted with a bearing as mentioned above.

BRIEF DESCRIPTION OF THE DRAWINGS

The invention will be better understood and other advantages of the latter will appear more clearly in the light of the following description of two embodiments of a ball bearing forming a clutch thrust bearing, given only as an example and made with reference to the appended drawings in which.

DETAILED DESCRIPTION OF THE INVENTION

The bearing 1 shown in FIGS. 1 to 4 forms a clutch thrust bearing for a motor vehicle knot shown). This bearing comprises a metal sleeve 2 designed to be attached to a piston not shown and centred on an input axis $X_2$ of the bearing 1. The bearing 1 also comprises an inner ring 3 and an outer ring 4 between which a chamber 5 is defined for receiving a single series of balls 6 held in relative position by virtue of a cage 7 also placed in the chamber 5.

$P_6$ is the centre plane of the balls 6, that is to say a plane passing through the respective centres of the balls 6.

The outer ring 4 is in contact with a diaphragm 10 which is partially represented in dot-and-dash lines by its mouths and which belongs to a clutch release mechanism known per se and which is not shown more fully.

$X_3$ and $X_4$ indicate the axes of symmetry of the rings 3 and 4 respectively.

Figure 1:
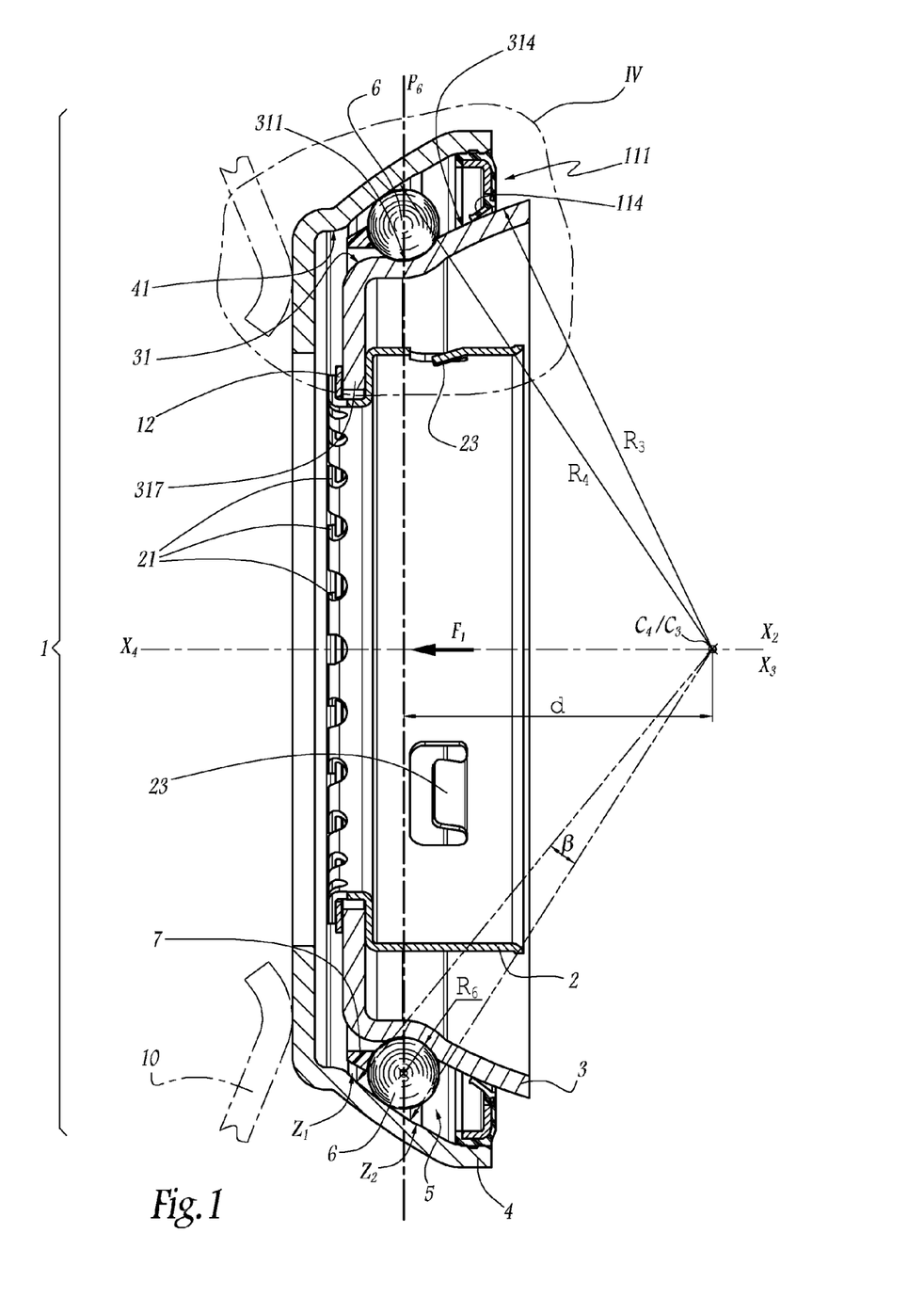
FIG. 1 is an axial section of a bearing according to the invention, in a first configuration of use.
Figure 2:
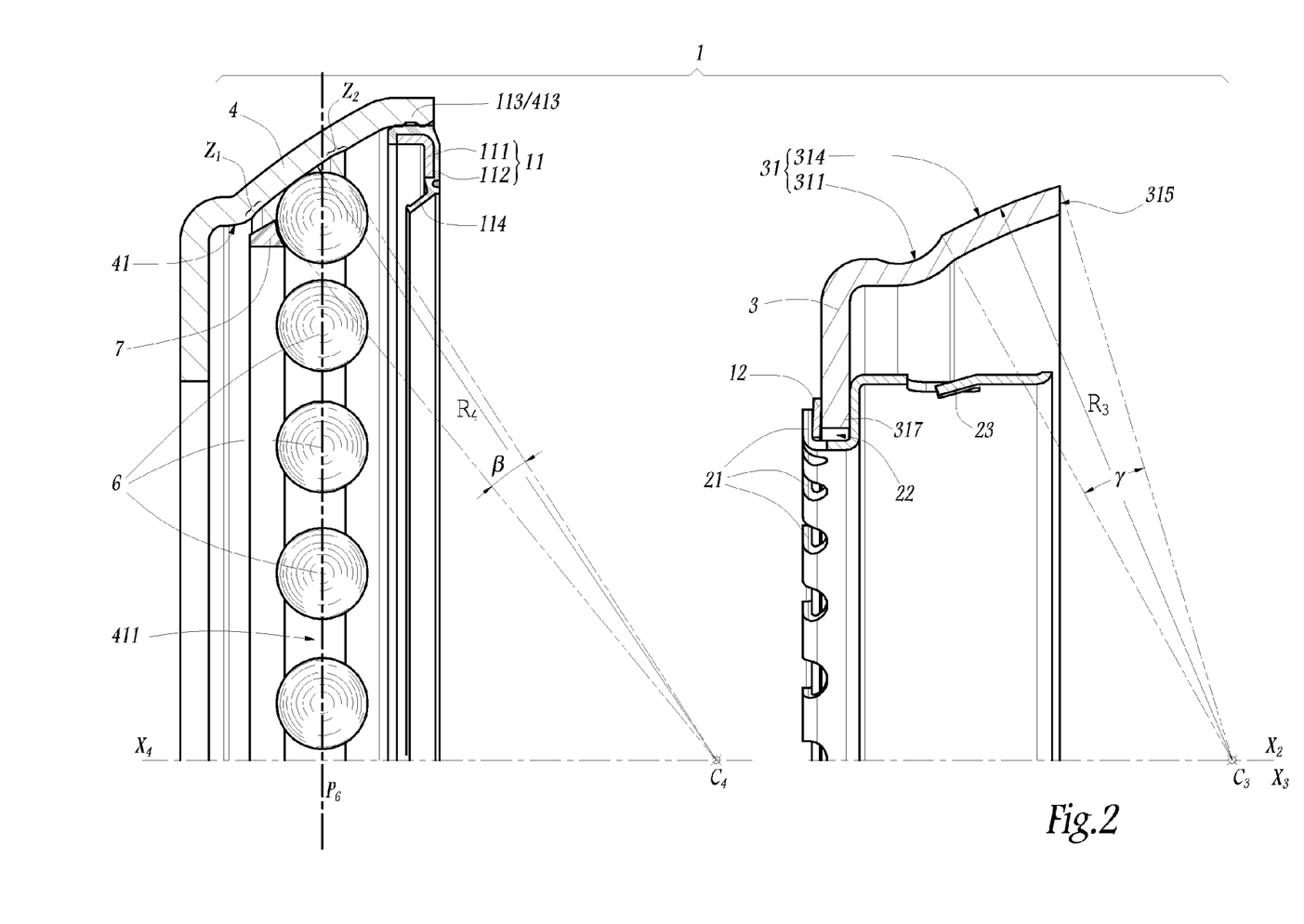
FIG. 2 is an axial half-section of a bearing of FIG. 1 being assembled.

In nominal configuration of use of the bearing 1 represent in FIG. 1, the axes $X_2$, $X_3$ and $X_4$ are superimposed. The balls 6 are resting both against the outer surface 31 of the inner ring 3 and against the inner surface 41 of the outer ring 4. More precisely, the surface 31 defines a groove 311 the generatrix of which is in the shape of an arc of a circle of radius $R_{311}$ substantially equal to the radius $R_6$ of the balls 6. Therefore, the balls 6 are positioned axially relative to the axis $X_3$ and the plane $P_6$ is perpendicular to the axis $X_3$.

Figure 3:
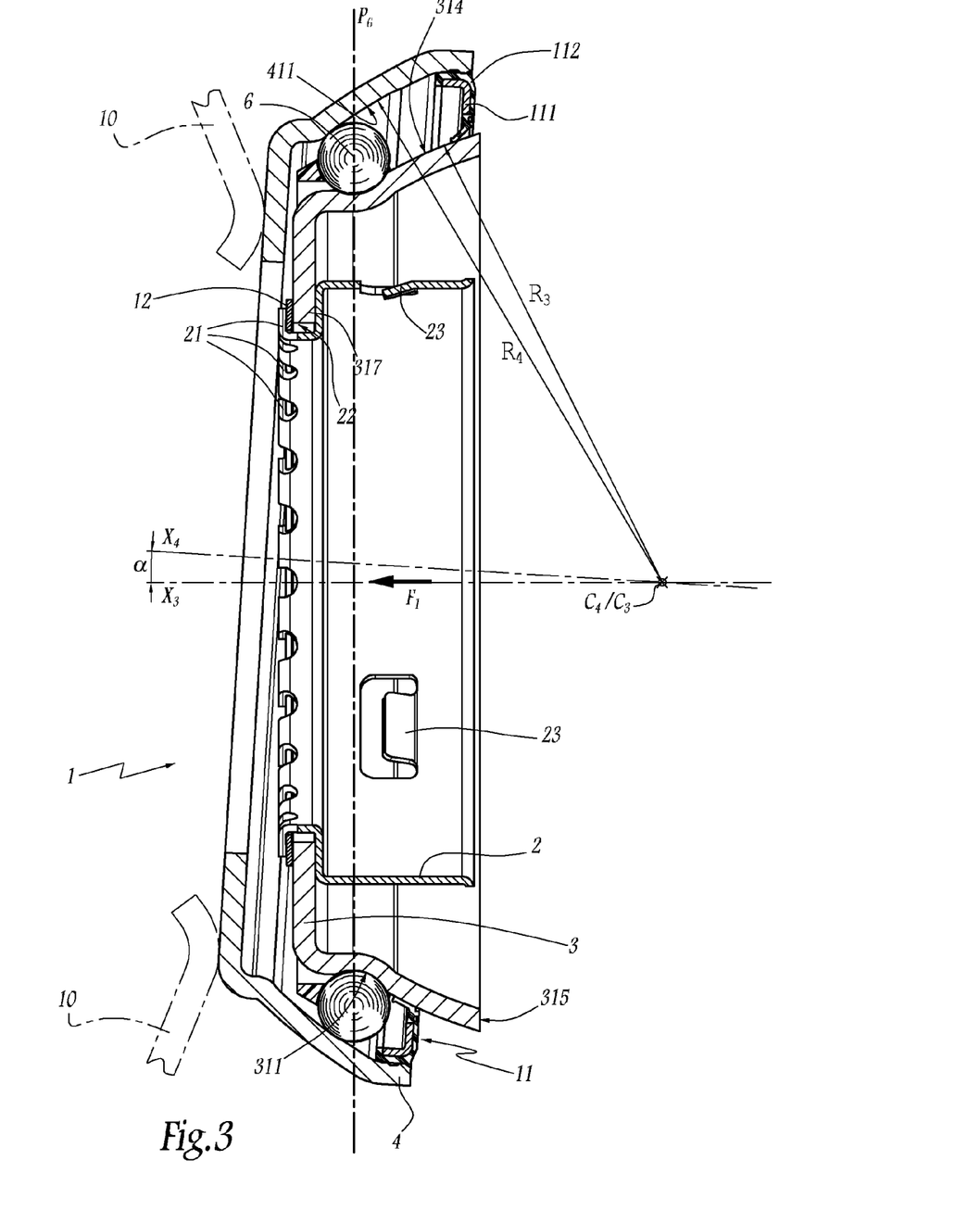
FIG. 3 is a section similar to FIG. 1, but the bearing is in a second configuration of use.

Because of the complexity of the clutch mechanism, tolerances of manufacture and of wear of the members with which the clutch thrust bearing formed by the bearing 1 interacts, the axes $X_3$ and $X_4$ can form between them a non-zero angle α, as shown in FIG. 3. In other words, considering that the axes $X_2$ and $X_3$ remain in line, the bearing 1 makes it possible to accommodate a defect of alignment between the axis $X_2$ on which a thrust force $F_1$ is exerted on the sleeve 2 and the axis of symmetry $X_4$ of the outer ring 4 as it is positioned by the diaphragm 10.

To do this, the surface 41 forms a travel track 411 on which the balls 6 can move in the plane of the figures, depending on the relative position of the axes $X_3$ and $X_4$. This travel track 411 is in the form of a section of a sphere centred on a point $C_4$ belonging to the axis $X_4$. The radius of the track 411, that is to say the distance between the point $C_4$ and the track 411, is marked $R_4$.

In a sectional plane passing through the axis $X_4$, the track 411 is defined by an arc of a circle centred on the point $C_4$ and the apex angle of which is marked 13. This arc of a circle extends between two zones $Z_1$ and $Z_2$ of transition between the track 411 and the rest of the surface 41. These zones $Z_1$ and $Z_2$ may themselves be in the form of an arc of a circle, with a radius of curvature smaller than the radius $R_4$ in stepped form or in bevelled form.

The value of the angle β is chosen according to the maximum admissible value for the angle α. For example, for a bearing that can accommodate a defect of alignment of the axes $X_3$ and $X_4$ of 3.5°, the value of the angle β is chosen between 5° and 9°, preferably of the order of 7°. The angle β forms the angle of travel of the balls 6 on the track 411.

A seal 11 is attached to the ring 4 and comprises a metal frame 111 and an elastomer portion 112 provided with a shoulder or protrusion 113 designed to be engaged in an inner radial groove 413 of the ring 4, in order to anchor the seal 11 relative to this ring. The frame 111 is designed to exert on the portion 112 a centrifugal force pressing the shoulder 113 into the groove 413. The portion 112 forms a lip 114 designed to slide on the surface 31 in order to insulate the chamber 5 from the outside.

Other structures can be envisaged for the seal 11, provided that the latter comprises a sealing lip such as the lip 114.

The surface 31 forms a sealing zone 314 designed to receive the lip 114 with sliding pressure, this sealing zone being in the shape of a section of a sphere centred on a geometric point $C_3$ belonging to the axis $X_3$ and having a radius $R_3$ strictly smaller than the radius $R_4$. In a sectional plane passing through the axis $X_3$, the sealing zone 314 is defined by an arc of a circle that is centred on the point $C_3$ and of which the apex angle is marked γ.

Figure 4:
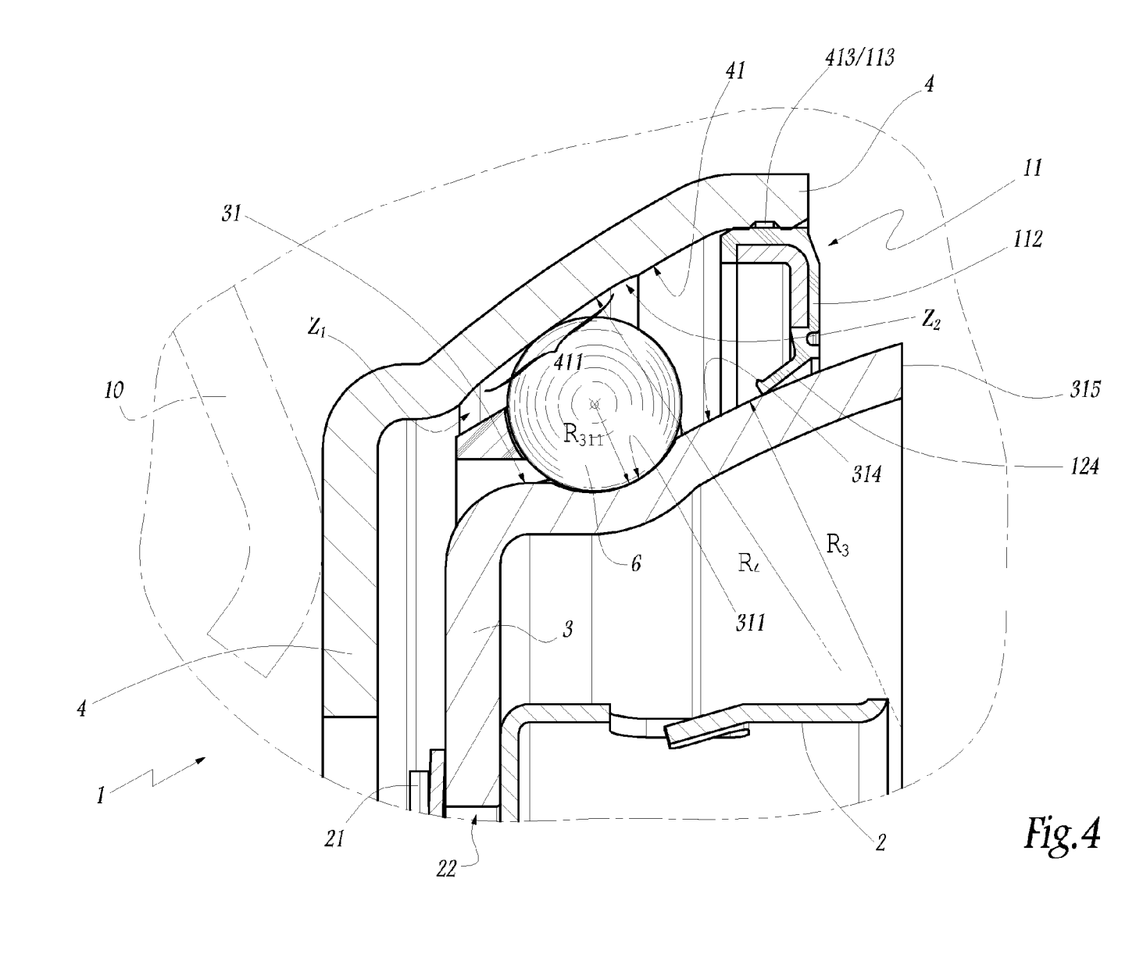
FIG. 4 is a view on a larger scale of the detail IV in FIG. 1.

In the installed configuration of the bearing 1, that is to say when the rings 3 and 4 together define the chamber 5 as shown in FIGS. 1, 3 and 4, the points $C_3$ and $C_4$ are indistinguishable, that is superimposed. Therefore, the swivel-joint movement of the ring 4 relative to the ring 3, which is possible because of the existence of the track 411, does not cause any change in the operating conditions of the seal 11 because the distance between the heal 113 and the sealing zone 314 remains constant throughout this swivelling. The lip 114 can therefore operate optimally, even if the axes $X_3$ and $X_4$ are out of alignment.

This results from the fact that the surfaces of the sections of a sphere of the track 411, on the one hand, and of the sealing zone 314, on the other hand, have the same shape and are centred on the same geometric point $C_3$ or $C_4$ in the installed configuration of the bearing 1.

In this installed configuration of the bearing 1, the points $C_3$ and $C_4$, which are superimposed, are offset along the axis $X_3$ relative to the series of balls 6. In other words, the axial distance d, measured along the axis $X_3$, between, on the one hand, the plane $P_6$ and, on the other hand, the points $C_3$ and $C_4$, is not zero.

In practice, the ratio of the distance d over the radius $R_4$ is between 0.25 and 0.75, preferably between 0.45 and 0.55. It can be considered that the distance d is substantially half of the radius $R_4$.

The fact that the points $C_3$ and $C_4$ are axially offset, along the axis $X_3$, relative to the series of balls 6 allows the bearing 1 to absorb axial forces, particularly the resistant force exerted by the diaphragm 10 on the outer ring 4.

The zone 314 extends generally between the groove 311 and an edge 315 of the ring 3 oriented away from the diaphragm 10. The apex angle γ of the sealing zone 314 has a value greater than that of the angle 13, so that it is possible to ensure that the lip 114 remains pressed on the surface 314 in all the positions of the ring 4 relative to the ring 3.

In the second embodiment of the invention shown in FIG. 4, similar elements to those of the first embodiment bear identical reference numbers. Described below is what distinguishes this embodiment from the preceding one.

Figure 5:
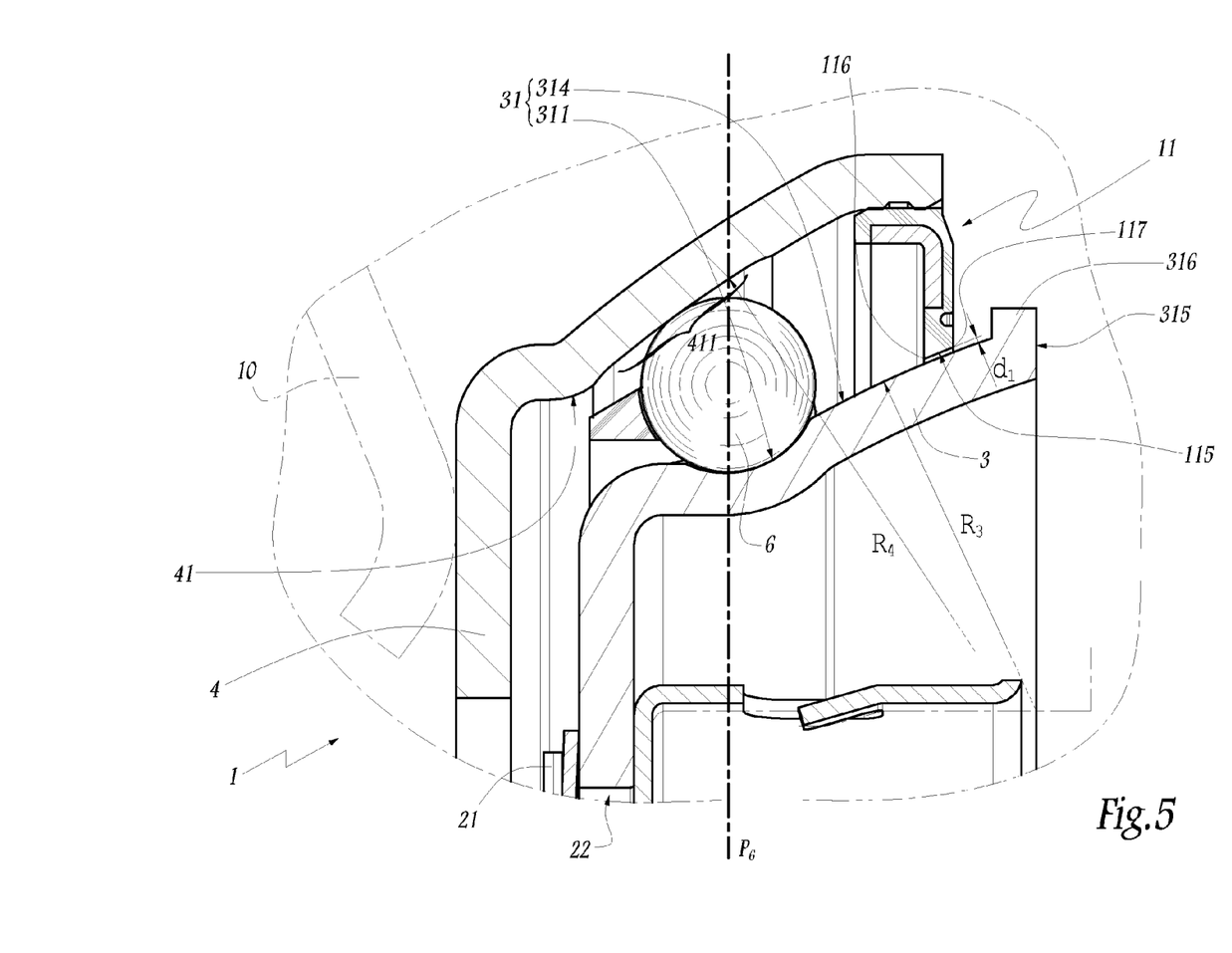
FIG. 5 is a view similar to FIG. 4 for a bearing according to a second embodiment of the invention.

The seal 11 of this embodiment is in the shape of a flange which does not extend to contact with the sealing zone 314 but comprises an edge 115 arranged between two ridges 116 and 117, in the shape of an arc of a circle centred on the axis $X_4$. The edge 115 is placed at a non-zero distance $d_1$ from the sealing zone 314. This distance $d_1$ is chosen with a low value, of the order of 0.1 to 0.2 mm, so that the seal 11 effectively fulfils its sealing function. Because the track 411 delimited by the internal surface 41 of the ring 4, on the one hand, and the sealing zone 314 delimited by the external surface 31 of the ring 3, on the other hand, are centred on one and the same geometric point $C_3/C_4$ in the assembled configuration of the bearing 1, the swivelling movement of the rings 3 and 4 relative to one another does not change the value of the distance $d_1$ which can therefore be chosen with a low value making it possible to effectively insulate the rolling chamber 5 relative to the outside.

Moreover, a shoulder 316 in the form of an external collar is placed in the vicinity of the edge 315 of the ring 3, so that the zone 314 extends, between the groove 311 for receiving the balls 6, and the edge 315, up to this shoulder. This shoulder limits the amplitude of movement of the seal 11 relative to the ring 3.

In the second embodiment also, the centres of curvature of the travel track 411 and of the sealing zone 314 are also superimposed or indistinguishable in the installed configuration of the bearing 1 and are axially offset relative to the row of balls, particularly relative to the centre plane $P_6$ of the balls.

In both embodiments, the sleeve 2 is installed with the possibility of radial movement relative to the ring 3. More precisely, the sleeve 2 is provided with lugs 21 which define an external zone 22 for receiving the internal radial edge 317 of the ring 3, with a radial clearance, so that the edge 317 can slide radially in the zone 22, which allows adjustment of the radial position relative to the parts 2 and 3. This makes it possible to accommodate a defect of alignment of the axes $X_2$ and $X_3$ when the latter are parallel but not superimposed. A conical ring 12 placed between the lugs 21 and the edge 317 has the function of helping to ensure a permanent axial preload between the ring 3 and the sleeve 2, even during possible relative radial movements of self-centring between the latter.

Furthermore, the sleeve 2 is provided with lances 23 allowing it to be coupled to the piston mentioned above, which ensures effective transmission of the force $F_1$ between the piston and the sleeve 2. The geometry of the sleeve 2 at the zone 22 makes it possible to transmit this force $F_1$ in the vicinity of the edge 317, this force being transmitted, between the ring 3 and the ring 4, through the balls 6.

In practice, the ring 3 is fixed in rotation about the axis $X_3$, while the ring 4 rotates about the axis $X_4$, at a speed which depends, notably, on the engine speed.

The invention has been represented and described above in the case in which the travel track 411 is provided on the outer ring 4, while the sealing zone 314 is provided on the inner ring 3. A converse solution is also possible. In other words the travel track may be provided on the inner ring 3 which then supports the seal, while the sealing zone designed to interact with this seal is provided on the outer ring 4.

The invention has been represented in the case of a clutch thrust bearing. It may however be used with other bearings designed to transmit an axial force $F_1$, particularly a bump stop of a motor vehicle.

Other applications can also be envisaged, such as a motor vehicle differential, an industrial clutch or an industrial gearbox.

A motor vehicle fitted with a bearing as described above is more reliable than those of the prior art since the service life of this bearing is enhanced.

The invention may be applied with a bearing the inner ring of which rotates and the outer ring is fixed, or vice versa.

The invention claimed is:

1. A ball bearing forming an axial-force transmission member, the bearing comprising:
    an inner ring having an axis of symmetry,
    an outer ring having an axis of symmetry and being spaced from the inner ring such that a rolling chamber is defined between the two rings,
    a plurality of balls disposed in the rolling chamber, and
    a seal configured to insulate the rolling chamber from the bearing exterior,
    wherein one of the inner ring and the outer ring has a travel track defined by a section of a sphere centered on a first geometric point located on the axis of symmetry of the one ring, the track supporting the seal and having a first radius, and the other one of the inner ring and the outer ring has a sealing zone configured to interact with the seal, the sealing zone being defined by a section of a sphere and generally centered on a second geometric point located on the axis of symmetry of the other one of the inner and outer rings and having a second radius with a value different than a value of first radius, the first and second geometric points being generally superimposed and offset from the series of balls generally along the axis of symmetry of the other one of the inner and outer rings, and
    a sleeve mounted on the inner ring, being movable in a radial direction relative to the central axis of the inner ring, and configured to transmit an axial force to the inner ring.

2. The bearing according to claim 1, wherein the seal includes a lip slidingly disposed against the sealing zone.

3. The bearing according to claim 1, wherein the seal has a surface spaced from the sealing zone by a predetermined distance, the distance remaining substantially fixed when there is relative movement between the inner and outer rings.

4. The bearing according to claim 1, wherein the other one of the inner and outer rings has a zone for receiving the balls and an edge spaced axially from the balls, the sealing zone extending generally between the zone for receiving the balls and the ring edge.

5. The bearing according to claim 1, wherein the other one of the inner and outer rings has a zone for receiving the balls, an edge spaced from the zone, and a shoulder between the zone and the edge and located adjacent to the edge, the sealing zone extending generally between the zone for receiving the balls and the shoulder.

6. The bearing according to claim 1, wherein an angle of travel of the balls on the travel track is between 5° and 9°.

7. The bearing according to claim 1, wherein an apex angle of the sealing zone has a value greater than a value of an apex angle of the travel track.

8. The bearing according to claim 1, wherein a ratio of an axial distance between the superimposed geometric points and a plane extending through the centers of the balls and the value of the radius of the travel track is between 0.25 and 0.75.

9. The bearing according to claim 1 wherein the bearing is configured to form a clutch thrust bearing of a motor vehicle.

10. The bearing according to claim 1, wherein the bearing is configured to form a bump stop of a motor vehicle.

11. A motor vehicle comprising a bearing including:
    an inner ring having an axis of symmetry,
    an outer ring having an axis of symmetry and being spaced from the inner ring such that a rolling chamber is defined between the two rings,
    a plurality of balls disposed in the rolling chamber, and a seal configured to insulate the rolling chamber from the bearing exterior, wherein one of the inner ring and the outer ring has a travel track defined by a section of a sphere centered on a first geometric point located on the axis of symmetry of the one ring, the track supporting the seal and having a first radius, and the other one of the inner ring and the outer ring has a sealing zone configured to interact with the seal, the sealing zone being defined by a section of a sphere and generally centered on a second geometric point located on the axis of symmetry of the other one of the inner and outer rings and having a second radius with a value different than a value of first radius, the first and second geometric points being generally superimposed and offset from the series of balls generally along the axis of symmetry of the other one of the inner and outer rings, and a sleeve mounted on the inner ring, being movable in a radial direction relative to the central axis of the inner ring, and configured to transmit an axial force to the inner ring.

* * * * *